United States Patent Office 3,679,446
Patented July 25, 1972

3,679,446
MOLDING MATERIALS OF CALCIUM SILICATE HYDRATE AND SHAPED PRODUCTS THEREOF
Kazuhiko Kubo, Motosu-gun, Gifu-ken, Japan, assignor to Kabushiki Kaisha Osaka Packing Seizosho, Osaka-shi, Japan
Filed June 2, 1969, Ser. No. 829,181
Claims priority, application Japan, June 4, 1968, 43/38,421; June 8, 1968, 43/39,531; Nov. 1, 1968, 43/80,135; Nov. 4, 1968, 43/80,820
Int. Cl. C04b 15/06
U.S. Cl. 106—120
10 Claims

ABSTRACT OF THE DISCLOSURE

A molding material of crystallized calcium silicate hydrate which comprises water and calcium silicate crystals dispersed in the water in the weight ratio of solid to water of between 1:10 and 1:25; at least 40 weight percent of said calcium silicate crystals having formed numerous small agglomerates of a diameter of 10 to 150 microns by being three-dimensionally interlocked with one another; and agglomerates being dispersed in the water in substantially globular form; a shaped product of crystallized calcium silicate hydrate which comprises agglomerates of calcium silicate crystals being compressed to at least one direction and interlocked with one another and voids interspersed therebetween, said agglomerates having had a diameter of 10 to 150$\mu$.

---

Figure 1:
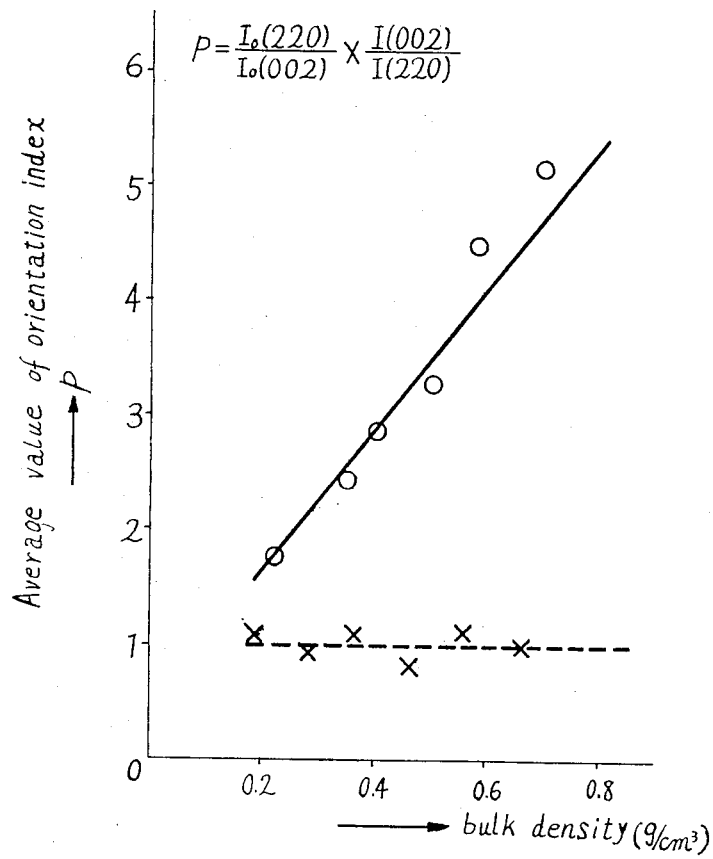

This invention relates to calcium silicate molding materials and shaped or molded products prepared therefrom.

It is well known in the art that a siliceous material is reacted with a calcareous material in the presence of water at elevated temperatures to produce calcium silicate hydrate. Various attempts utilizing such a lime-silica reaction have been made for the formation of molded calcium silicate products, particularly light-weight thermal insulating materials. However, there are a number of disadvantages in the prior products and the processes of manufacture, as illustrated hereinbelow.

One general method heretofore employed is a so called "pan casting" method. According to this method shaped products of calcium silicate hydrate are prepared by mixing calcareous and siliceous materials with water, with application of heat, to product amorphous calcium silicate gel, pouring the gel thus obtained into a mold having an approximate shape of the final product desired, subjecting the gel while in the mold to an indurating step which is carried out in an autoclave under steam pressure, whereby the gel undergoes a final chemical reaction to produce hard mass of crystallized calcium silicate hydrate and drying the mass removed from the mold to produce the product substantially free of uncombined water.

Another typical method is a so called "filter molding" method, in which expanded amorphous calcium silicate gel prepared by reacting a calcareous material with a siliceous material in the presence of water at 100° C. or thereabout is molded by a piston filter molding to produce a self-supporting mass and the resultant mass removed from the mold is indurated in an autoclave under steam pressure, the indurated mass thereafter being dried.

According to these methods it is difficult to produce a shaped product having uniform properties and excellent mechanical strength with light-weight property unless the induration reaction is conducted for a long period of time, as the amorphous calcium silicate gel is used as a molding material and subjected to the induration step while in the mold or after molding. Further the shaped product can not satisfactorily withstand highly elevated temperatures. For example, the product mainly composed of tobermorite crystals is liable to decrease mechanical strength markedly at 650° C. or thereabout and to disintegrate or break down at over 700° C. And the product mainly composed of xonotlite crystals tends to decrease the mechanical strength markedly at a temperature higher than about 1,000° C.

As evident from the description above, according to the prior processes it is indispensable to subject calcium silicate gel used as a molding material to the induration step, and there has been proposed no molding material capable of producing a shaped product of crystallized calcium silicate hydrate therefrom merely by molding and drying without induration step under steam pressure.

One object of the invention is to provide a novel molding material capable of producing merely by molding and drying without any application of steam pressure a shaped product of crystallized calcium silicate hydrate having uniform and excellent properties and being useful for various purposes as thermal insulating materials, building materials, etc.

Another object of the invention is to provide a molding material containing tobermorite crystals from which a shaped product of tobermorite crystals can be obtained merely by molding and drying.

A further object of the invention is to provide a molding material containing xonotlite crystals from which a shaped product of xonotlite crystals can be obtained merely by molding and drying.

A still further object of the invention is to provide a molding material containing both tobermorite crystals and xonotlite crystals from which a shaped product of the both crystals can be obtained merely by molding and drying.

Still another object of the invention is to provide a shaped product of calcium silicate crystals which is excellent and uniform in mechanical strength and resistance to heat.

A further object of the invention is to provide a shaped product of tobermorite, xonotlite or wallastonite crystals which has excellent mechanical strength as well as light-weight property and which is useful as thermal insulating materials.

A further object of the invention is to provide a shaped product of tobermorite, xonotlite or wollastonite crystals which has highly excellent mechanical strength and is useful as building materials.

A further object of the invention is to provide a shaped product of tobermorite, xonotlite or wollastonite crystals free from deterioration in mechanical strength at highly elevated temperatures.

These and other objects of the invention will be apparent from the following description.

The molding material of the invention comprises water and calcium silicate crystals dispersed in the water in the reight ratio of solid to water of between 1:10 and 1:25; at least 40 weight percent of said calcium silicate crystals having formed numerous small agglomerates of a diameter of 10 to 150 microns by being three-dimensionally interlocked with one another; and said agglomerates being dispersed in the water in substantially globular form.

The present inventor has so far carried out various experiments on a method for manufacturing shaped products of calcium silicate hydrate and has already filed United States of America patent application of Ser. No. 649,114, now U.S. Pat. No. 3,501,324, which relates to a method of producing a molding material containing calcium silicate hydrate and to a method of producing a shaped product of calcium silicate hydrate therefrom. The present inventor has further conducted researches on a molding material of crystallized calcium silicate hydrate from which a shaped product having high mechanical strength can be produced merely by molding and drying without application of steam pressure. As a result, it has now been found that the calcium silicate aqueous slurries in which calcium silicate crystals are dispersed in the water in the specific conditions as above enable the manufacture of molded products of excellent mechanical strength merely by molding and drying without applying any steam pressure, whereas it is known that the conventional slurries of calcium silicate hydrate in which calcium silicate hydrate does not form said specific agglomerates are difficult to produce molded products of sufficient strength merely by molding and drying.

The calcium silicate crystals which constitute said specific agglomerate are platy crystals of tobermorite having a formula of $4CaO \cdot 5SiO_2 \cdot 5H_2O$ or $5CaO \cdot 6SiO_2 \cdot 5H_2O$, lathe-like crystals of-xonotlite having the formula of $5CaO \cdot 5SiO_2 \cdot H_2O$ or $6CaO \cdot 6SiO_2 \cdot H_2O$, or a mixture of the tobermorite and xonotlite crystals.

The aqueous slurry used as a molding material of the present invention contains calcium silicate crystals dispersed in the water in the weight ratio of solid to water between 1:10 and 1:25, preferably between 1:11 and 1:15. The calcium silicate crystals are three-dimensionally interlocked with one another to form a large number of small agglomerates having 10 to $150\mu$ in diameter, whereby the objective shaped product of the present invention can be obtained merely by molding and drying. The agglomerates, when smaller than $10\mu$ in diameter, make it difficult to carry out molding by a piston filter molding, while greater agglomerates exceeding $150\mu$ result in a shaped product which is poor in mechanical strength. The preferable particle diameter of the agglomerate ranges from 30 to $90\mu$. However, it is not required that all of the calcium silicate crystals in the slurry be in the form of agglomerates which are 10 to $150\mu$ in diameter, but those agglomerates smaller than $10\mu$ or more than $150\mu$ may also be involved in the slurry in less than a certain amount. By experiments the present inventor has found out that so far as 40 weight percent of calcium silicate crystals dispersed in water are in the form of agglomerates of 10 to $150\mu$, a shaped product superior to a conventional product in mechanical strength and heat resistance can be obtained merely by molding and drying.

In practical operation, it is desired that as many calcium silicate crystals as possible be formed in agglomerates of 10 to $150\mu$, and the best results are attained with an aqueous slurry in which 90 to substantially 100 weight percent of calcium silicate crystals are formed in agglomerates of 10 to $150\mu$.

The diameters of agglomerates given in the present specification and claims are determined through inspection by optical microscope.

The above-mentioned proportion of the calcium silicate forming the agglomerates of 10 to $150\mu$ is determined by preparing an aqueous slurry in which substantially all of the calcium silicate crystals are formed in agglomerates of 10 to $150\mu$, mixing this slurry with another aqueous slurry of calcium silicate crystals having no above-mentioned agglomerates in various proportion and studying the molding property of the resultant slurry and physical properties of shaped products obtained therefrom.

The aqueous slurry in which substantially all of the calcium silicate crystals are formed in agglomerates of 10 to $150\mu$ can be produced by fulfilling the production conditions to be described later.

The above-mentioned agglomerates of 10 to $150\mu$ are formed of calcium silicate crystals which are interlocked with one another three-dimensionally in substantially globular shape. This is apparently appreciated in a dark ground micrograph of the slurry of the invention. That is, a great number of agglomerates, substantially globular in shape, can be observed in a dark ground micrograph taken at a magnification of 120 diameters. Each agglomerate has numerous voids formed among the crystals.

The process for manufacturing the aqueous slurry of the invention is of a secondary significance and not critical in the invention, and any methods capable of producing aqueous slurry as specified before are applicable.

The basic technic of one preferred method for the production is described in our patent application Ser. No. 649,114, now U.S. Pat. No. 3,501,325, invented by the present inventor. In the above method a starting aqueous slurry of siliceous material calcareous material and water is reacted with stirring under a saturated steam pressure of at least 5 kg./cm.$^2$ gauge to produce crystallized calcium silicate hydrate.

The siliceous material used may include, for example, amorphous silica, siliceous sand, diatomaceous earth, clays, silica gel, pozzollana, perlite, etc., and preferably one may be determined in accordance with the desired calcium silicate crystals to be produced. For the selective production of xonotlite crystal, for example, those containing higher than 90 weight percent of SiO component may be preferably used. As the presence of $Al_2O_3$ component in the siliceous material tends to prevent the selective production of xonotlite crystal, it is preferable to use siliceous material containing no or less than 2 weight percent of $Al_2O_3$, most desirable being amorphous silica. For the selective production of tobermorite crystal the presence of impurities, such as $Al_2O_3$, $MgO$, $Fe_2O_3$, etc., does not affect so adversely as in the case of the production of xonotlite, and those containing more than 50 weight percent of $SiO_2$ and less than 50 weight percent of the above impurities may be used. The siliceous material is used in the form of finely divided form passing through a 325 mesh screen. Preferable particle size is less than $5\mu$, most preferable being less than $0.2\mu$. The calcareous material used in the invention may, for example, be quick lime, slaked lime, carbide residium, etc. Of those, quick lime and slaked lime are preferable for the production of xonotlite crystals, though various calcareous material, such as carbide residue as well as quick lime and slaked lime may be used for the production of tobermorite.

The amount of the lime relative to the siliceous material may be in the molar ratio of $CaO:SiO_2$ of between 0.65:1 and 1.3:1. The preferable ratio may be selected in accordance with the crystaline structure to be desired. Other reaction conditions, e.g., pressure temperature, reaction period may also effect the crystalline structure to be produced. Therefore, by selecting these conditions tobermorite crystal, xonotlite crystal or a mixture thereof can be selectively obtained. As far as the amount of the lime relative to the siliceous material is concerned, a molar ratio of $CaO:SiO_2$ of between 0.65:1 and 1:1 is preferable for the production of tobermorite crystal, and a molar ratio of that of between 0.8:1 and 1.3:1 is preferable for the production of xonotlite crystal. Although the preferable ratio is overlapped, at such overlapped ratio tobermorite, xonotlite or a mixture thereof may be obtained in accordance with other reaction conditions applied. But when the ratio of $CaO$ to $SiO_2$ is less than 0.65:1 or that of $CaO$ to $SiO_2$ is higher than 1:1, it is not preferable for the production of tobermorite crystal, and when the ratio of $CaO$ to $SiO_2$ is higher than 1.3:1 or that of $CaO$ to $SiO_2$ is less than 0.8:1 it is undesirable for the production of xonotlite crystal. Most preferable ratio of $CaO$ to $SiO_2$ is 0.75:1 to 0.9:1 for tobermorite crystals and 0.95:1 to 1:1.1 for xonotlite crystals.

The amount of water used in the starting slurry is critical for the production of the desired aqueous slurry molding material of the invention and may be used in such proportion as to produce the aqueous slurry of calcium silicate crystals having the weight ratio of solid to water of between 1:10 and 1:25, preferably between 1:11 and 1:15. When water is used in less or larger amount it becomes difficult to produce agglomerates of 10 to $150\mu$, failing to obtain the desired slurry of the invention.

Inorganic fibers, such as asbestos, rock wool, glass fiber, etc., may be added to the starting slurry for reinforcing purpose in an amount of less than 50 percent, preferably of about 5 to 20 percent, based on the weight of the total weight of the solids in the slurry, i.e., calcareous and siliceous materials used and reinforcing fibers added.

To accelerate the production of xonotlite crystal finely divided wollastonite particles (CaO·SiO₂) may be added to the starting aqueous slurry in 2 to 30 weight percent, preferably 5 to to 20 weight percent, based on the total weight of the solids.

The starting slurry is heated with stirring under a steam pressure to produce the hydrous calcium silicate aqueous slurry of the invention. The preferable stirring conditions can be determined with the constitution of reactor, types of agitator, crystalline structure to be obtained, etc. According to the experiments of the present inventor it has been found that when a cylindrical autoclave equipped with a paddle-type agitator is used as a reactor the preferable agitating speed (N) is evaluated from the following experimental equation:

$$N = N' \left(\frac{D'}{D}\right)^{\frac{2}{3}}$$

wherein N is a preferable agitating speed in terms of r.p.m. to be determined, N' is a revolution number per minute ranging from 75 to 500, D' is 0.14 in meter and D is an inner diameter in meter of the cylindrical autoclave used. For the production of aqueous slurry of xonotlite crystals N' is preferably a number ranging from 75 to 300, but for the production of aqueous slurry of tobermorite or a mixture of tobermorite and xonotlite crystals N' ranges from 75 to 500.

The steam pressure applied is usually higher than 5 kg./cm.² gauge and the higher the steam pressure, the shorter becomes the reaction period. Suitable reaction pressure may be selected in accordance with the crystalline structure to be desired. For the production of tobermorite a pressure of between 8 and 20 kg./cm.² is preferable, and for xonotlite a pressure of between 8 and 50 kg./cm.² is preferable. The overlapped preferable pressure for tobermorite and xonotlite have the same signficance as that illustrated with respect to the amount and quality of the starting siliceous material and calcareous material. The reaction temperature is the saturated temperature under such saturated steam pressure.

The period required to complete the reaction between lime and silica will depend, for example, on reaction pressure and temperature, the mixing ratio of the calcareous and siliceous materials and the crystalline structure of calcium silicate hydrate to be desired. In general, the reation for the production of tobermorite may be completed in about 1 to 10 hours, and that for xonotlite is in about 0.5 to 20 hrs. in accordance with the reaction conditions. The reaction vessel used is a pressure autoclave equipped with an agitator or stirrer and pressure gauge.

The aqueous slurry of the present invention may contain a reinforcing material or some other additives. Applicable as reinforcing materials are inorganic fibers such as asbestos fibers, rock wool, glass fibers or the like, or organic fibers such as pulp fiber, wood flour, polyamide fibers, polyester fibers, or the like. With addition of these paterials, the shaped product obtained from the slurry of the invention can be remarkably improved in mechanical strength, particularly in bending strength. Most preferably asbestos may be used as a reinforcing material. Inorganic fibers such as asbestos, rock wool, etc. may previously be mixed with a starting aqueous slurry of calcereous material and siliceous material as mentioned before, but the reinforcing materials may ordinarily be added directly to the aqueous slurry of the invention. The aqueous slurry molding material obtained by the former method results in a shaped product which is superior in mechanical strength, especially in bending strength and less susceptible to deterioration in strength when subjected to high temperatures. Presumably, this is due to the interlocking of the reinforcing materials with the agglomerates of calcium silicate crystals effected during the thermal hydration reaction, and this is more conspicuously effected when asbestos is used as the reinforcing material. In a dark ground micrograph taken at a magnification of 100 diameters showing the present aqueous slurry prepared by the above-mentioned method with addition of asbestos, a number of agglomerates are observed to tangle about asbestos fibers. In either of the foregoing methods, the reinforcing materials are added in a proportion of less than 50 weight percent, preferably of 5 to 20 weight percent based on the total weight of the solids in the slurry, namely of calcium silicate crystals and solid in the slurry of calcium silicate crystals and solid additives. Of reinforcing materials pulp fiber may be added in larger amount, i.e. up to 80 weight percent, based on the total weight of the solids, for the production of building materials.

To the slurry of the present invention, various solid additives other than the reinforcing materials may also be added. The addition of clay, in particular, is advantageous in that the shaped product obtained is rendered more resistant to heat. As a clay for this purpose, bentonite, kaolin, pyrophylite, fire clay or the like may be employed, the range of addition being 3 to 50 weight percent, preferably 5 to 40 weight percent based upon the weight of solids in the slurry.

Furthermore, in order to make the shaped product obtained from the present slurry more serviceable as buliding materials for certain purposes by increasing its bulk density and hardness of the surface, cement may be mixed therewith. It is preferable to add cement in a range of from 5 to 60 percent, preferably from 10 to 50 percent, based on the weight of solids in the slurry.

To obtain a shaped product from the slurry of the present invention, the slurry, as it is or after it has been concentrated to a paste form, is molded into a desired shape as, for example, in plate or bent form while being subjected to dehydration to remove excess water. The resultant product has only to be dried to substantially remove uncombined water. In this step filter molding may preferably be employed.

The filter molding comprises placing the present slurry in a female mold having a desired form and a plurality of small holes and pressing the slurry by a male mold to remove excess water until a self-supporting mass is formed, there being no substantial difference from a conventional method in which a molding material of calcium silicate gel is formed into a shaped product by the conventional filter molding. Further in case of a slurry containing pulp, the slurry is formed into a sheet, which is then pressed into a molded product in sheet form by means of a paper machine and dried to obtain a finished product. Drying can be done at an atmosphere pressure and temperature, but under reduced pressure or by heating drying period can be reduced.

Thus the shaped product comprising tobermorite crystals or a mixture of tobermorite and xonotlite crystals can be obtained respectively from the molding material in the form of aqueous slurry containing the corresponding crystals. The shaped product comprising wollastonite crystals can be produced from the shaped product of xonotlite crystals thus obtained by heating it a 800 to 1,050° C. to convert the xonotlite crystals to β-wollastonite.

The shaped product of the present invention is characterized by a specific structure comprising agglomerates joined with one another and voids interspersed among the agglomerates, the agglomerates being in the form compressed to the direction of pressure applied in the molding step. Namely, the agglomerates in the present shaped product are compressed more or less in at least one direction due to the pressure applied in the molding step. Since the agglomerates in themselves are of considerable strength, they are not completely crushed unless subjected to an exceedingly great molding pressure. The bulk density of a shaped product made of a slurry having no solid additives therein chiefly depends upon the pressure applied at the time of molding operation. That is to say, low molding pressure results in lower bulk density of a shaped product and high molding pressure in greater bulk density. Therefore, a shaped product having low bulk density is composed of agglomerates which are compressed but not crushed. In fact, when the broken surface of shaped product having bulk density (g./cm.$^3$) not exceeding 0.45 and formed from slurry without addition of additives is magnified and observed through an optical microscope, the globular agglomerates are found to form shaped product as they are interlocked with one another. The broken surface as herein used means a surface which is formed by splitting a shaped product in two with careful attention so as not to cut off or destroy the agglomerates. For instance, the surface obtained by cutting the shaped product by a knife, even if magnified, no longer exhibit agglomerates. This can also be ascertained by inspecting a transmission photograph showing the thin section of the shaped product and taken at a right angle with the pressing directing at the time of molding. To obtain this picture, a cube of 5 mm. x 5 mm. x 5 mm. in size having a plane at a right angle with the pressing direction is cut off from a shaped product and the cube is impregnated with a styrene monomer under reduced pressure, the impregnated cube thereafter being embedded with a resin in accordance with embedding method to obtain a thin section 20$\mu$ in thickness in the manner set forth in The Chemistry of Cement, vol. 2, pp. 235–236 (1964) edited by H. F. W. Taylor. The sample thus prepared is photographed to obtain a transmission photograph at a magnification of 120 diameters, in which a number of agglomerates appeared dark because of low transmission of light, with the boundary thereof seen in white due to transmission of light. The shaped product having a bulk density of not exceeding 0.45 produced from a slurry containing no additives such as reinforcing materials has sufficient mechanical strength and heat-insulating property, although a strong product has not been made by the conventional method without addition of reinforcing materials. A shaped product of this type having a bulk density in the order of 0.18 to 0.40 is particularly useful as a heat-insulating material. With a shaped product in accordance with the present invention having a bulk density of over 0.45 and containing no additives, it is difficult to identify the agglomerates in the magnified photograph or transmission photograph. When diffracted by X-ray, however, such shaped product exhibits peculiar orientation, showing the agglomerates forming the shaped product compressed strongly in the direction of pressure applied in the molding step. That is to say, when seen in an X-ray diffraction pattern showing a plane at a right angle with the pressing direction of the xonotlite shaped product of this type, diffracted intensity of (001) is greater than that of (320), while in case of the X-ray diffraction pattern of a non-oriented sample prepared from the above-mentioned shaped product, the intensity of (001) is always smaller than that of (320), thus showing that the shaped product of the present invention presents distinct orientation. Such orientation cannot be found in a shaped product of calcium silicate crystals which is prepared in a conventional method and commercially available. The shaped product of the present invention is characterized in that the average value of orientation index ($p$) for shaped products of a mixture is greater than 2.0, the average value of orientation index of a conventional shaped product of calcium silicate being approximately equal to 1.0.

Orientation index ($p$) for shaped product of $$\text{tobermorite crystals} = \frac{I_o(220)}{I_o(002)} \times \frac{I(002)}{I(220)}$$

Orientation index ($p$) for shaped product of $$\text{xonotlite} = \frac{I_o(320)}{I_o(001)} \times \frac{I(001)}{I(320)}$$

Orientation index ($p$) for shaped product of a mixture of tobermorite and xonotlite crystals $$= \frac{I_o(320) + I_o(220)}{I_o(001)} \times \frac{I(001)}{I(320) + I(220)}$$

or $$\frac{I_o(320) + I_o(220)}{I_o(002)} \times \frac{I(002)}{I(320) + I(220)}$$

or

Orientation index ($p$) for shaped product of $$\text{wollastonite crystals} = \frac{I_o(310)}{I_o(002)} \times \frac{I(002)}{I(310)}$$

wherein $I$ represents X-ray diffraction intensities of a plane at a right with the pressing direction of the shaped product according to the present invention and $I_o$ represents X-ray diffraction intensities of the nonoriented sample prepared from the relevant shaped product of the present invention in accordance with Brindley's method for elimination of orientation as described in the American Mineralogist, Journal of Mineralogical Society of America, vol. 46, Nos. 11 and 12, pp. 1208–1209 (1961).

"The average value of orientation index" used in the present specification and claims means the average value of the respective orientation indexes which are obtained by measuring ten samples taken out at random from each sample to be examined.

As apparent in the above equation, the average value of the orientation index ($p$), when it is greater than 2.0, means that, in case, for example, of a shaped product of xonotlite crystals, the (001) plane of the crystals is oriented to a considerably great extent in parallel with the plane which is at a right angle with the pressing direction of the shaped product, and when the average value of $p$ is 1, it means that no orientation is effected.

In shaped products containing solid additives, such as reinforcing materials, clays and/or cement, the bulk density thereof varies in accordance with the kinds and amounts of the solid additives added as well as the pressure applied in the molding step. Therefore, unlike in a shaped product free of solid additives, there exists no distinct difference in characteristics due to the bulk density in case of such shaped product. Of shaped products containing a substance such as cement which are great in specific gravity, regardless of whether their bulk densities are more than 0.45, there are some whose agglomerates can readily be identified in a magnified or transmission photograph showing the broken surface or thin section, with the average value of orientation index less than 2.0. However, the shaped product which has been compressed to such extent that the agglomerates thereof can not be identified has an average value of the orientation index exceeding 2.0, even if the agglomerates can not be identified. In general, in case of those which have the average value of not exceeding 2.0, the agglomerates can be identified, whereas those having agglomerates which can not be identified have average value of orientation index over 2.0.

While the shaped products of wollastonite crystals which are prepared by heating the shaped products of xonotlite crystals, the agglomerates forming the products are not broken and the specific orientation mentioned above is not changed substantially either by the heat applied in their production. Thus all the present shaped products of tobermorite crystals, xonotlite crystals, a mixture of tobermorite and xonotlite crystals, or wollastonite crystals show the same trend as mentioned before in the form of the agglomerates and in the orientation.

The shaped products of the present invention give a number of advantages as compared with the products prepared by the conventional method due to the specific structure thereof which is characterised by the presence of numerous agglomerates jointed with one another and compressed in at least one direction. The advantageous properties and usefulness of the present shaped products vary in accordance with the structures of crystals constituting each agglomerate forming the product, bulk density of the product, absence or presence of solid additives, kinds of solid additives if contained, etc., and they are summarized below.

In accordance with conventional pan casting method and filter molding method, it was impossible to obtain light-weight and strong shaped products of tobermorite crystals, xonotlite crystals or a mixture of both of these crystals unless a reinforcing material such as asbestos is added thereto, whereas the shaped products of the present invention formed of the above-mentioned crystals, containing no reinforcing material of such type, are light in weight and high in strength for practical use. Thus, there is no need to use a relatively expensive reinforcing material like asbestos and in addition, the products are free from various objections attributable to impurities contained in asbestos, especially to iron contents. For instance, a conventional calcium silicate product, in case where it is employed as a heat-insulating material in a cementation furnace, not infrequently resulted in destruction of the constituent members of the furnace due to the fact that the iron contents in the asbestos causes higher decomposition of carbon monoxide to produce deposition of carbon. The use of the shaped product of this invention which contains no asbestos eliminates such disadvantage.

Since the shaped product of the present invention is formed of the aqueous slurry of crystallized calcium silicate hydrate, shaped products containing various solid additives can be obtained depending upon the uses intended.

For instance shaped products containing reinforcing materials are higher in mechanical strength than those containing none of these materials and in case where the bulk density is low the products of the invention are more excellent than conventional ones in mechanical strength, hence quite useful for heat insulating purposes.

The shaped product of the invention, when formed of a molding material obtained from a starting slurry with asbestos fibers especially has a high mechanical strength by far superior to a conventional product, the inventive product being characterized by markedly low deterioration in strength and small contraction when subjected to heat. The shaped product greater in bulk density has a sufficiently high strength as a building material. For this purpose, organic fibers such as pulp fibers may advantageously be used and the products containing the organic fibers are provided with greater strength than those without such fiber additives. Moreover, they are useful as fireproof building materials especially for ceiling and partition since the pulp fibers therein do not burn when exposed to fire. Further in case where cement such as portland cement is included as a component it serves to improve the product not only in mechanical strength but also in hardness of surface, thus providing the product with a wider variety of uses.

A remarkable improvement is also achieved in shaped products which contain clays. That is to say, the products containing clays are higher in mechanical strength than those without clay additives and undergo smaller deterioration in strength and hardly any contraction.

Although a shaped product comprising wollastonite crystals was difficut to produce and was not commercially available, a crack-free shaped product formed of wollastonite can be produced easily by firing the present shaped product of xonotlite crystals at a high temperature. This shaped product is hardly impaired in strength and shows only negligible contraction even when subjected to high heat of about 1000 to 1050° C. so that it is advantageous to employ this type of product as a heat-insulating material under high temperatures.

For better understanding of the invention examples are given below, in which all parts and percentages are in weight and the physical properties of shaped products were determined in accordance with the following method:

Bending strength _____ JIS–A–9510
Coefficient of linear contraction _____ JIS–A–9510

EXAMPLE 1

1–(1) Preparation of molding material

To 20.3 liters of water was added 757 g. of quick lime for slaking, and to the resultant solution of slaked lime was added with stirring 933 g. of siliceous sand passing through a 325 mesh screen, whereby a starting aqueous slurry containing slaked lime and siliceous sand was obtained. Analysis of the siliceous sand used was as follows:

|  | Percent |
|---|---|
| $SiO_2$ | 91.91 |
| $Al_2O_3$ | 4.46 |
| $Fe_2O_3$ | 0.32 |
| Ig. loss | 3.31 |

The starting slurry thus obtained was placed in an autoclave, 30 cm. in diameter and 40 cm. in depth, equipped with a paddle-type agitator and heated with stirring of 56 r.p.m. at 190.7° C. under a steam pressure of 12 kg./cm.² gauge for 5 hours. The autoclave was thereafter cooled to room temperature and the resultant slurry was taken out therefrom. Thus the aqueous slurry of calcium silicate crystals having a solid concentration of 8.3% was obtained.

In X-ray diffraction, the crystals contained in the resultant slurry showed a pattern peculiar to the tobermorite crystals at 11.4 A., 5.49 A., 3.08 A., 2.98 A. and 2.82 A.

The slurry thus obtained contained numerous agglomerates dispersed in the water. The agglomerates were globular in shape and had a particle size of 20 to 70μ. The same results were recognized when 120-diameter dark ground micrographs of 10 portions of the above slurry taken out at random therefrom were inspected showing that almost all of the globular agglomerates had a particle size of 20 to 70μ and that substantially all of the tobermorite crystals formed such agglomerates. Each agglomerate was constituted by numerous tobermorite crystals interlocked with one another.

1–(2) Preparation of shaped product

The slurry obtained as above was placed into a female mold having numerous holes and pressed with various pressure by a male mold so as to produce six kinds of shaped products in plate form, 7.5 cm. in width, 15 cm. in length and 1–5 cm. in thickness with different bulk densities. The products were removed from the mold and dried in an air oven at 190° C.

The resultant dried products had the following bulk densities.

TABLE 1

| Product No.: | Bulk density |
|---|---|
| 1 | 0.22 |
| 2 | 0.35 |
| 3 | 0.40 |
| 4 | 0.51 |
| 5 | 0.59 |
| 6 | 0.75 |

The structural characteristics of the resultant dried products were ascertained by a micrograph of the broken surface of each product, a transmission view of the thin section of each product and X-ray diffraction of each product.

FIG. 1 shows a graph of an average value of the orientation index of each product in relation to the bulk density thereof with the comparative data of the shaped products prepared by Comparison 1 below.

COMPARISON 1

It was difficult to produce calcium silicate products having bulk densities corresponding approximately to products Nos. 1 to 6 by the conventional filter molding method using the same starting materials in Example 1–(1), and therefore the comparative products were prepared in the following manner in which diatomaceous earth was used as siliceous material in place of siliceous sand.

1.25 kg. of quick lime was slaked in 50 liters of water warmed at 80° C., to which was added with stirring 1.95 kg. of diatomaceous earth, and the mixture was heated for 1.5 hours in an open vessel to produce calcium silicate hydrate gel. Analysis of the diatomaceous earth used was as follows.

| | Percent |
| --- | --- |
| $SiO_2$ | 79.83 |
| $Al_2O_3$ | 9.67 |
| $Fe_2O_3$ | 2.22 |
| CaO | 3.46 |
| MaO | 0.37 |
| Ig. loss | 4.45 |

The gel thus obtained was inspected by a microscope in a dark ground micrograph taken at a magnification of 120 diameters, but no agglomerates were observed.

The resultant gel was molded as in Example 1–(2) and the molded mass was placed in an autoclave to subject it to the induration step which was carried out at 190.7° C. under a steam pressure of 12 kg./cm.$^2$ gauge for 5 hours, and then dried, producing 6 kinds of comparative products having the following bulk densities.

TABLE 2

| Product No.: | Bulk density |
| --- | --- |
| C–1 | 0.19 |
| C–2 | 0.28 |
| C–3 | 0.37 |
| C–4 | 0.46 |
| C–5 | 0.57 |
| C–6 | 0.66 |

X-ray diffraction of each product showed the product comprised tobermorite crystals, but many cracks occurred during the induration step.

The shaped product (No. 1) of the invention having a bulk density of 0.22 was formed of numerous globular agglomerates jointed with one another. From a transmission view of the same product, it is observed that a number of agglomerates forming the product are seen in dark because of low transmission of light with the boundary thereof in white due to transmission of light.

A micrograph of the broken section of the products Nos. 2 and 3 and transmission view of these products shows the respective products were formed of a number of agglomerates jointed with one another.

The presence of agglomerates was not recognized so exactly as above from the same inspection carried out by using the products Nos. 4 to 6 having a bulk density of larger than 0.45, but the average value of the orientation index thereof gave the specific condition as shown in FIG. 1. From this figure it is seen that the average value of orientation index of the present products increases approximately in proportion to bulk density of the product and the products Nos. 4 to 6 showed marked orientation exceeding 2.0 of the average value of the index, while the value of the comparative products Nos. C–1 to C–6 was approximately 1.0, showing no orientation.

The mechanical strength of the present products Nos. 1 to 6 and comparative products Nos. C–1 to C–6 are shown in Table 3 following.

TABLE 3

| Product Number | Bulk density | Bending strength (kg./cm.$^2$) |
| --- | --- | --- |
| 1 | 0.22 | 1.97 |
| 2 | 0.35 | 2.2 |
| 3 | 0.40 | 8.5 |
| 4 | 0.51 | 10.3 |
| 5 | 0.59 | 12.5 |
| 6 | 0.75 | 18.9 |
| C–1 | 0.19 | (¹) |
| C–2 | 0.28 | (¹) |
| C–3 | 0.37 | (¹) |
| C–4 | 0.46 | (¹) |
| C–5 | 0.57 | (¹) |
| C–6 | 0.66 | (¹) |

¹ Unmeasurable due to numerous cracks.

EXAMPLE 2

To 1117 parts of the aqueous slurry of tobermorite crystals obtained in the same manner as in Example 1–(1) was added 70 parts of 10 percent water dispersion of asbestos fiber and then mixed thoroughly.

Six kinds of shaped products having different bulk densities shown below were prepared in the same manner as in Example 1–(2) from the mixture thus obtained.

TABLE 4

| Product No.: | Bulk density |
| --- | --- |
| 7 | 0.21 |
| 8 | 0.31 |
| 9 | 0.39 |
| 10 | 0.48 |
| 11 | 0.60 |
| 12 | 0.70 |

Figure 2:
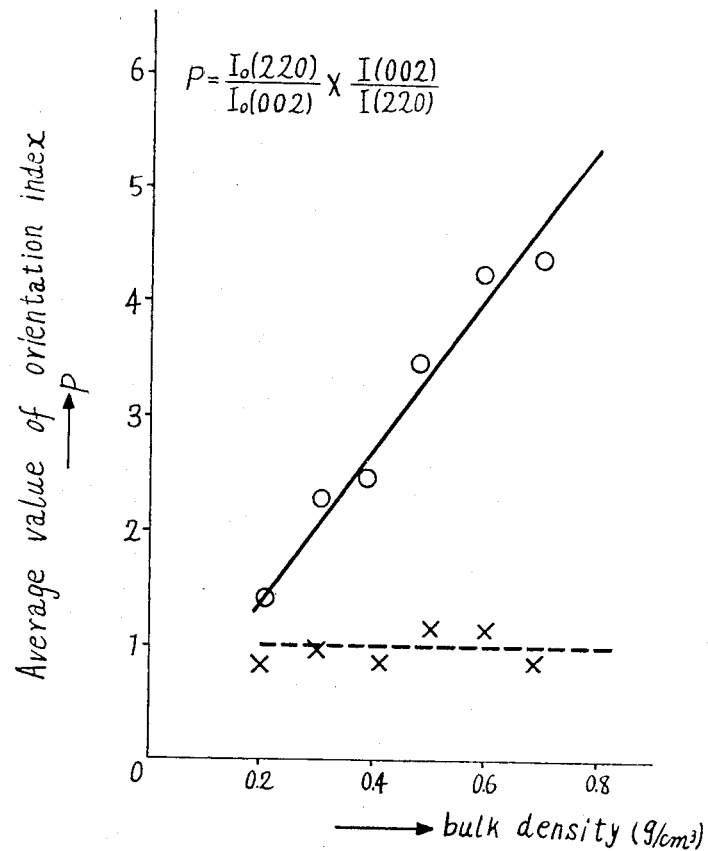

The structural characteristics of the resultant dried products were inspected in the same manner as in Example 1–(2). From a micrograph of the broken surface of the products Nos. 7 to 9 having a bulk density ranging from 0.21 to 0.39, it was found that those products were composed of a large number of agglomerates jointed with one another and asbestos fibers. While almost no agglomerates were found in the products Nos. 10 to 12 having higher density in the same micrograph thereof, it was ascertained by the measurement of the orientation index that such products Nos. 10 to 12 exhibited a specific orientation as shown in FIG. 2, in which the orientation indexes of the comparative products Nos. C–7 to C–12 prepared by the method described in Comparison 2 below were shown for comparative purpose.

COMPARISON 2

1.19 kg. of quick lime was slaked in 50 liters of water warmed at 80° C., to which were added with stirring 0.231 kg. of asbestos fibers and 1.88 kg. of diatomaceous earth the same as in Comparison 1, and the mixture was heated at 97° C., for 1.5 hours in an open vessel to produce calcium silicate hydrate gel. The gel thus obtained was inspected through a dark ground micrograph taken at a magnification of 120 diameters, but no agglomerates were observed.

The resultant gel was molded as in Comparison 1 and the molded mass was indurated at 190.7° C. under a steam pressure of 12 kg./cm.$^2$ for 5 hours, and then dried, producing six kinds of comparative products having the following density.

TABLE 5

| Product No.: | Bulk density |
| --- | --- |
| C–7 | 0.20 |
| C–8 | 0.31 |
| C–9 | 0.42 |
| C–10 | 0.51 |
| C–11 | 0.60 |
| C–12 | 0.68 |

X-ray diffraction of each product showed the product comprised tobermorite crystals.

Frim FIG 2 it is seen that the average value of orientation index of the present products increases approximately in proportion to bulk density of the product and the products Nos. 10 to 12 showed marked orientation exceeding 2.0 of the average value of the index, while the value of the comparative products Nos. C–7 to C–12 was approximately 1.0, showing no orientation.

The mechanical strength and heat resistance of the products were shown in Table 6 below.

TABLE 6

| Product No. | After preparation | After 3 hrs. firing at 650° C. | | After 3 hrs. firing at 800° C. | |
| --- | --- | --- | --- | --- | --- |
| | Bulk density | Bending strength (kg./cm.²) | Bending strength (kg./cm.²) | Coefficient of linear contraction (percent) | Bending strength (kg./cm.²) | Coefficient of linear contraction (percent) |
| 7 | 0.21 | 4.55 | 2.65 | 0.89 | 1.0 | 1.50 |
| 8 | 0.31 | 9.60 | 4.15 | 0.71 | 2.0 | 1.28 |
| 9 | 0.39 | 18.71 | 10.35 | 0.73 | 5.4 | 1.26 |
| 10 | 0.48 | 25.26 | 11.58 | 0.72 | 6.3 | 1.30 |
| 11 | 0.60 | 33.10 | 18.64 | 0.76 | 9.4 | 1.42 |
| 12 | 0.70 | 38.05 | 20.10 | 0.76 | 10.3 | 1.41 |
| C–7 | 0.20 | 4.20 | 2.10 | 1.24 | (¹) | |
| C–8 | 0.31 | 6.45 | 3.58 | 1.26 | (¹) | |
| C–9 | 0.42 | 18.62 | 6.48 | 1.26 | (¹) | |
| C–10 | 0.51 | 26.32 | 12.30 | 1.28 | (¹) | |
| C–11 | 0.60 | 30.50 | 12.60 | 1.33 | (¹) | |
| C–12 | 0.68 | 33.00 | 15.30 | 1.36 | (¹) | |

¹ Broken.

EXAMPLE 3

To 997 parts of the aqueous slurry of tobermorite crystals obtained in the same maner as in Example 1 was added 170 parts of 10% water dispersion of pulverized bentonite passing through a 325 mesh screen and then mixed thoroughly. The analysis of the bentonite used gave the following results:

| | Percent |
| --- | --- |
| $SiO_2$ | 73.84 |
| $Al_2O_3$ | 13.24 |
| $Fe_2O_3$ | 1.29 |
| Ig. loss | 3.46 |

From the resultant mixture were produced in the same manner as in Example 1 six kinds of shaped products having different bulk densities shown below.

TABLE 7

| Product No.: | Bulk density |
| --- | --- |
| 13 | 0.20 |
| 14 | 0.30 |
| 15 | 0.41 |
| 16 | 0.50 |
| 17 | 0.61 |
| 18 | 0.69 |

Figure 3:
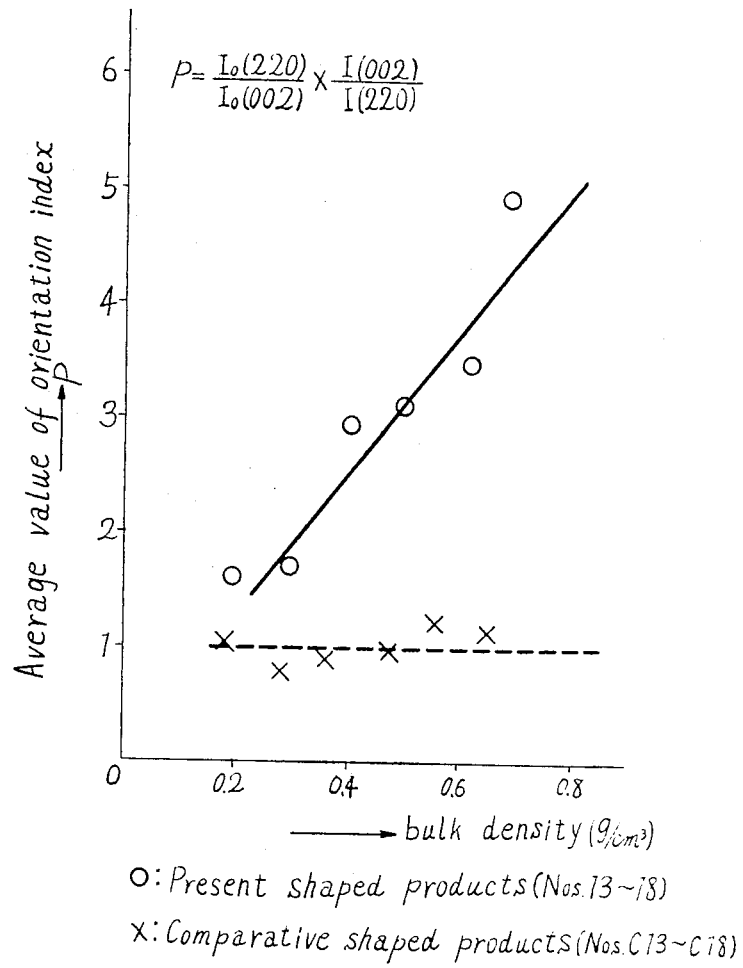

The structural characteristics of the resultant dried products were inspected in the same manner as in Example 1. From a micrograph of the broken surface of the products Nos. 13 to 15 having a bulk density ranging from 0.20 to 0.41, it was found that those products were composed of a large number of agglomerates jointed with one another and pulverized clay dispersed therein. While almost no agglomerates were found in the products Nos. 16 to 18 having higher density in the same micrograph thereof, it was ascertained by the measurement of the orientation index that such products Nos. 16 to 18 exhibited a specific orientation as shown in FIG. 3, in which the orientation indexes of the comparative products Nos. C–13 to C–18 prepared by the method described in Comparison 3 below were shown for comparative purpose.

COMPARISON 3

1.06 kg. of quick lime was slaked in 50 liters of water warmed at 80° C., to which were added with stirring 0.56 kg. of bentonite and 1.68 kg. of diatomaceous earth the same as in Comparison 1, and the mixture was heated in an open vessel at 97° C. for 1.5 hours to produce calcium silicate hydrate gel. The gel thus obtained was inspected in a dark ground micrograph taken at a magnification of 120 diameters, but no agglomerates were observed.

Six kinds of shaped products having different densities shown below were prepared in the same manner as in Comparison 2 from the resultant gel.

TABLE 8

| Product No.: | Bulk density |
| --- | --- |
| C–13 | 0.18 |
| C–14 | 0.28 |
| C–15 | 0.37 |
| C–16 | 0.48 |
| C–17 | 0.56 |
| C–18 | 0.65 |

X-ray diffraction showed that crystalline structure of each product was tobermorite, but many cracks occurred in the products during induration step.

From FIG. 3 it is seen that the orientation index of the present products increases approximately in proportion to bulk density of the product and the products Nos. 16 to 18 show marked orientation exceeding 2.0 of the average value of the index, while the value of the comparative products Nos. C–13 to C–18 was approximately 1.0, showing no orientation.

The mechanical strength and heat resistance of the products are shown in Table 9 below.

TABLE 9

| Product No. | After preparation | After 3 hrs. firing at 650° C. | | After 3 hrs. firing at 810° C. | |
| --- | --- | --- | --- | --- | --- |
| | Bulk density | Bending strength (kg./cm.²) | Bending strength (kg./cm.²) | Coefficient of linear contraction (percent) | Bending strength (kg./cm.²) | Coefficient of linear contraction (percent) |
| 13 | 0.20 | 5.2 | 2.20 | 0.89 | 2.03 | 1.40 |
| 14 | 0.30 | 4.03 | 3.12 | 1.03 | 2.20 | 1.52 |
| 15 | 0.41 | 12.51 | 8.30 | 1.01 | 6.20 | 1.68 |
| 16 | 0.50 | 20.20 | 15.25 | 0.90 | 12.24 | 1.38 |
| 17 | 0.61 | 25.30 | 21.30 | 9.90 | 19.15 | 1.60 |
| 18 | 0.69 | 33.50 | 25.40 | 0.92 | 23.50 | 1.63 |
| C–13 | 0.18 | (¹) | | | | |
| C–14 | 0.28 | (¹) | | | | |
| C–15 | 0.37 | (¹) | | | | |
| C–16 | 0.48 | (¹) | | | | |
| C–17 | 0.56 | (¹) | | | | |
| C–18 | 0.65 | (¹) | | | | |

¹ Unmeasurable for numerous cracks.

EXAMPLE 4

To 913 parts of the aqueous slurry of tobermorite crystals obtained in the same manner as in Example 1–(1) were added 70 parts of 10% water dispersion of asbestos fiber and 170 parts of 10% water dispersion of bentonite the same as in Example 3 and then mixed thoroughly.

Six kinds of shaped products having different bulk densities shown below were prepared in the same manner as in Example 1 from the resultant mixture.

TABLE 10

| Product No.: | Bulk density |
|---|---|
| 19 | 0.22 |
| 20 | 0.31 |
| 21 | 0.40 |
| 22 | 0.49 |
| 23 | 0.60 |
| 24 | 0.71 |

X-ray diffraction of the resultant product showed that the crystalline structure thereof was tobermorite. From FIG. 4 it is seen that the orientation index of the present products increases approximately in proportion to bulk density of the product and the products Nos. 22 to 24 show marked orientation exceeding 2.0 of the average value of the index, while the value of the comparative products (products Nos. C-19 to C-24) was approximately 1.0, showing no orientation.

The mechanical strength and heat resistance of the products were shown in Table 12 below.

TABLE 12

| | After preparation | After 3 hrs.' firing at 650° C. | | After 3 hrs.' firing at 810° C. | |
|---|---|---|---|---|---|
| Product No. | Bulk density | Bending strength (kg./cm.$^2$) | Bending strength (kg./cm.$^2$) | Coefficient of linear contration (percent) | Bending strength (kg./cm.$^2$) | Coefficient of linear contraction (percent) |
| 19 | 0.22 | 5.84 | 4.75 | 0.67 | 4.54 | 1.63 |
| 20 | 0.31 | 10.50 | 9.25 | 0.67 | 8.71 | 1.33 |
| 21 | 0.40 | 18.50 | 15.00 | 0.63 | 13.42 | 1.20 |
| 22 | 0.49 | 25.30 | 20.20 | 0.63 | 16.30 | 1.23 |
| 23 | 0.60 | 32.40 | 30.20 | 0.63 | 22.50 | 1.30 |
| 24 | 0.71 | 35.30 | 31.30 | 0.68 | 30.68 | 1.30 |
| C-19 | 0.19 | 4.62 | 2.43 | 1.06 | ($^1$) | |
| C-20 | 0.30 | 6.32 | 3.31 | 1.63 | ($^1$) | |
| C-21 | 0.39 | 11.06 | 4.28 | 1.60 | ($^1$) | |
| C-22 | 0.47 | 20.90 | 10.20 | 1.63 | ($^1$) | |
| C-23 | 0.56 | 28.89 | 15.21 | 1.60 | ($^1$) | |
| C-24 | 0.65 | 38.20 | 19.42 | 1.52 | ($^1$) | |

$^1$ Broken.

Figure 4:
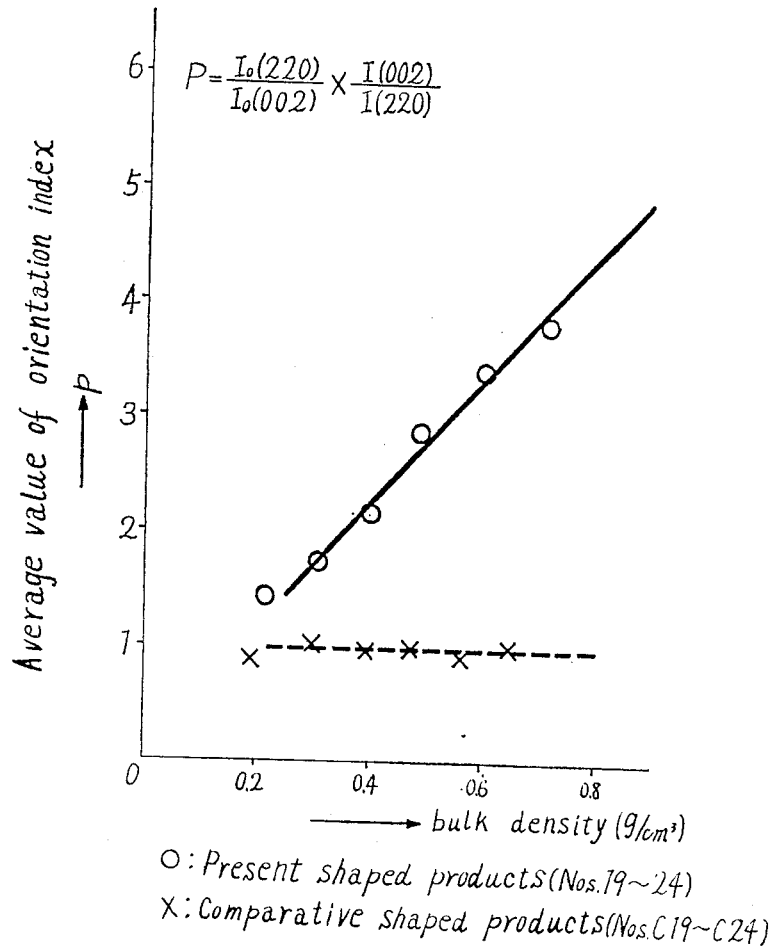

The structural characteristics of the resultant dried products were inspected in the same manner as in Example 1. From a micrograph of the broken surface of the products Nos. 19 to 21 having a bulk density ranging from 0.22 to 0.40, it was found that those products were composed of large number of agglomerates jointed with one another and asbestos fibers and pulverized clay dispersed therein. While almost no agglomerates were found in the products Nos. 22 to 24 having higher density through the same micrograph thereof, it was ascertained by the measurement of the orientation index that such products Nos. 22 to 24 exhibited a specific orientation as shown in FIG. 4, in which the orientation indexes of the comparative products Nos. C-19 to C-24 prepared by the method described in Comparison 4 below were shown for comparative purpose.

COMPARISON 4

0.97 kg. of quick lime was slaked in 50 liters of water warmed at 80° C., to which were added 0.23 kg. of asbestos fibers, 0.56 kg. of bentonite the same as in Comparison 3 and 1.54 kg. of diatomaceous earth, and the resultant mixture was heated in an open vessel at 97° C. for 1.5 hours to produce calcium silicate hydrate gel. The gel thus obtained was inspected in a dark ground micrograph taken at a magnification of 120 diameters, but no agglomerates were observed.

The resultant gel was molded and indurated in the same manner as in Comparison 2, producing six kinds of products having the following bulk densities.

TABLE 11

| Product No.: | Bulk density |
|---|---|
| C-19 | 0.19 |
| C-20 | 0.30 |
| C-21 | 0.39 |
| C-22 | 0.47 |
| C-23 | 0.56 |
| C-24 | 0.65 |

EXAMPLE 5

To 20.3 liters of water were added quick lime and siliceous sand the same as in Example 1 in the amounts shown in Table 13 and the mixture was thoroughly mixed to produce six kinds of starting slurries.

TABLE 13

| | Amount | | |
|---|---|---|---|
| Slurry number | Quick lime used (g.) | Siliceous snad used (g.) | Molar ratio (CaO/SiO$_2$) |
| S-1 | 647 | 1,043 | 0.65/1 |
| S-2 | 678 | 1,012 | 0.70/1 |
| S-3 | 705 | 985 | 0.75/1 |
| S-4 | 732 | 958 | 0.80/1 |
| S-5 | 758 | 932 | 0.85/1 |
| S-6 | 780 | 910 | 0.90/1 |

Each starting slurry thus obtained was placed in an autoclave, 30 cm. in diameter and 40 cm. in depth, equipped with an agitator and heated with stirring of 60 r.p.m. at 187° C. under a steam pressure of 11 kg./cm.$^2$ gauge for 5 hours. Thus 6 kinds of the aqueous slurries of calcium silicate crystals having a solid concentration of 8.3 percent were obtained.

By X-ray diffraction the crystals contained each resultant slurry showed the pattern peculiar to the tobermorite crystals at 11.4 A., 5.49 A., 3.08 A. and 2.98 A. A dark ground micrograph and electron micrograph of each resultant slurry show that the slurry contained numerous agglomerates, globular in shape, having a particle size of 20 to 70μ which was constituted with numerous plate-like tobermorite crystals interlocked with one another.

913 parts of the respective slurries were mixed with 70 parts of 10% water dispersion of asbestos fiber and 170 parts of 10% water dispersion of bentonite, from which shaped product were prepared in the same manner as in Example 1, with the results shown in Table 14 following.

TABLE 14

| Product number | Slurry used (slurry Number) | Bulk density | Bending strength (kg./cm.²) | After 3 hrs.' firing at 650° C. Bending strength (kg./cm.²) | Coefficient of linear contraction (percent) |
|---|---|---|---|---|---|
| 25 | S-1 | 0.178 | 3.83 | 3.77 | 0.54 |
| 26 | S-2 | 0.197 | 3.81 | 3.57 | 0.80 |
| 27 | S-3 | 0.190 | 3.92 | 3.03 | 0.80 |
| 28 | S-4 | 0.198 | 4.21 | 3.65 | 0.67 |
| 29 | S-5 | 0.183 | 5.57 | 5.50 | 0.47 |
| 30 | S-6 | 0.204 | 5.30 | 3.45 | 0.63 |

Through the inspection of a micrograph of the broken surface of each shaped product thus obtained it was ascertained that it was formed of numerous agglomerates jointed with one another.

EXAMPLE 6

6–(1) Preparation of molding material 828 grams of quick lime was slaked in 20.3 liters of warm water and the solution of the slaked lime was mixed with 862 grams of amorphous silica having a particle size of less than 5μ to prepare a starting slurry. The analysis of the amorphous silica gave the following results.

|  | Percent |
|---|---|
| $SiO_2$ | 96.97 |
| $Al_2O_3$ | 1.39 |
| $Fe_2O_3$ | 0.07 |
| Ig. loss | 0.93 |

The starting slurry thus obtained was placed in an autoclave, 30 cm. in diameter and 40 cm. in depth, equipped with a paddle-type agitator and heated with stirring of 56 r.p.m. at 187° C. under steam pressure of 11 kg./cm.² gauge for 10 hours. Thus the aqueous slurry of calcium silicate crystals having a solid concentration of 8.3 percent was obtained.

In X-ray diffraction of the crystals contained in the resultant slurry gave the specific pattern to the xonotlite crystal at 7.80 A., 3.23 A., 3.08 A., and 2.83 A. A dark ground micrograph of the resultant slurry taken at a magnification of 120 diameters and an electron micrograph taken at a magnification of 13,000 diameters show the agglomerates in the slurry.

It is evident that the slurry thus obtained contained numerous agglomerates dispersed in the water and the agglomerates, globular in shape, had a diameter of 40 to 150μ. While 120-diameter dark ground micrograph of 10 portions of the above slurry taken out at random therefrom was inspected, they showed almost all of the globular agglomerates had particle size 40 to 150μ and that substantially almost all of the xonotlite crystals formed such agglomerates. Each agglomerate comprised numerous xonotlite crystals interlocked with one another.

6–(2) Preparation of shaped product

The slurry obtained as above was placed into a female mold having numerous holes and pressed with various pressures by a male mold so as to produce six kinds of shaped products in plate form, 7.5 cm. in width, 15 cm. in length and 1–5 cm. in thickness with different bulk densities. The products were removed from the mold and dried in an air oven at 105° C.

The resultant dried products had the following bulk densities.

TABLE 15

| Product No.: | Bulk density |
|---|---|
| 31 | 0.21 |
| 32 | 0.30 |
| 33 | 0.41 |
| 34 | 0.50 |
| 35 | 0.61 |
| 36 | 0.70 |

The structural characteristics of the resultant dried products were ascertained by a microscopic view of the broken surface of each product, a transmission view of the thin section of each product and X-ray diffraction of each product.

Figure 5:
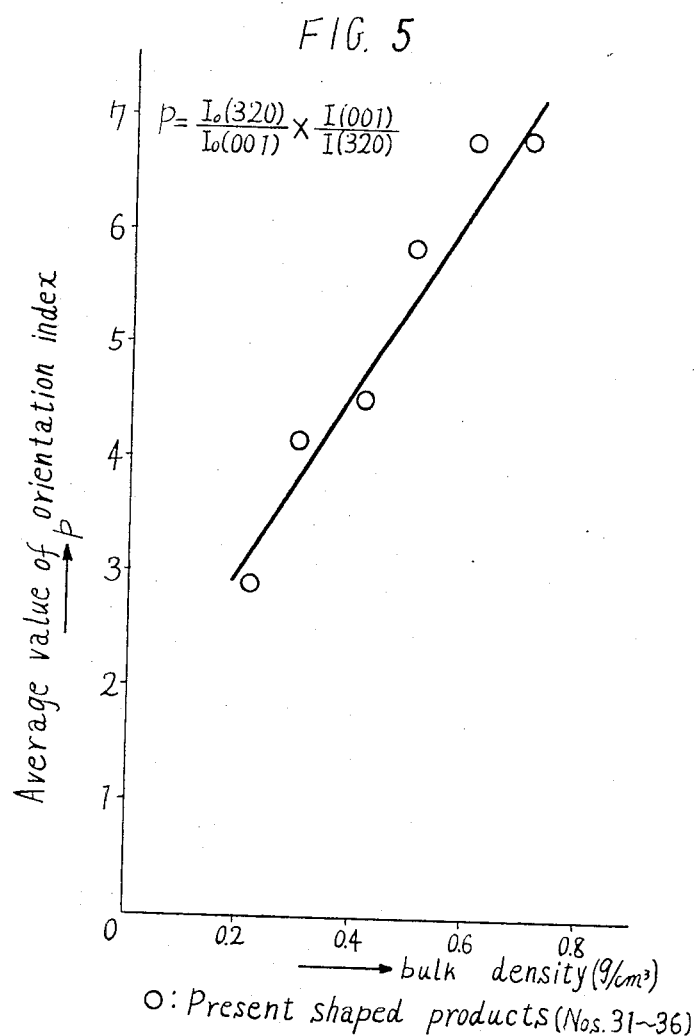

FIG. 5 shows a graph of an average value of the orientation index of each product in relation to the bulk density thereof.

The shaped product (No. 31) of the invention having a bulk density of 0.21 was formed of numerous globular agglomerates jointed with one another. From the transmission view of the same product, it is observed that a number of agglomerates forming the produced appeared dark because of low transmission of light with the boundary thereof seen in white due to transmission of light.

The micrograph of the broken section of the products Nos. 32 and 33 and transmission view of these products, show the respective products were formed of a number of agglomerates jointed with one another.

The presence of agglomerates were not recognized so exactly as above from the same inspection carried out by using the products Nos. 34 to 36 having a bulk density of larger than 0.45, but the average value of the orientation index thereof gave the specific condition as shown in FIG. 5.

From FIG. 5 it is seen that the average value of orientation index of the present products increases approximately in proportion to bulk density of the product and the products Nos. 34 to 36 exhibited marked orientation exceeding 2.0 of the average value of the index.

The mechanical strength and heat resistance of the products were shown in Table 16 below.

TABLE 16

| | After preparation | | After 3 hrs.' firing at 1,000° C. | |
|---|---|---|---|---|
| Product No. | Bulk density | Bending strength (kg./cm.²) | Bending strength (kg./cm.²) | Coefficient of linear contraction percent |
| 31 | 0.21 | 6.38 | 4.74 | 0.74 |
| 32 | 0.30 | 12.3 | 9.20 | 0.51 |
| 33 | 0.41 | 18.2 | 13.10 | 0.48 |
| 34 | 0.50 | 24.5 | 15.30 | 0.80 |
| 35 | 0.61 | 36.80 | 21.20 | 0.68 |
| 36 | 0.70 | 43.30 | 30.30 | 0.80 |

Figure 6:
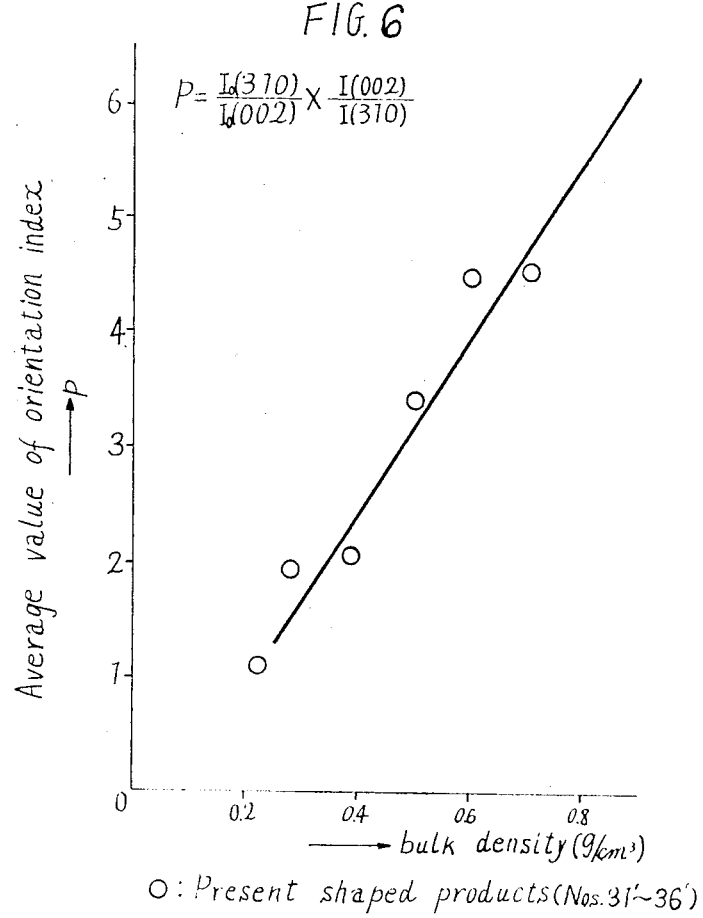

The X-ray diffraction of the respective shaped products in the above examples subjected to firing at 1000° C. for 3 hours showed that the xonotlite crystals forming the shaped body have all transformed into β- wollastonite crystals. The micrograph of the broken surface taken at a magnification of 120 diameters of products Nos. 31–33 subjected to firing and 120-diameter transmission images of thin sections of the same coincided with those of products Nos. 31–33 taken before firing. Accordingly it was recognized that only the constituent crystals were transformed into β-wollastonite without the agglomerates being destroyed. Furthermore, with respect to the fired products of products Nos. 34–36, the same images thereof hardly showed any agglomerates as with those of the same products before firing, but exhibited distinct orientation. The average values of orientation index of the respective products are illustrated in FIG. 6.

Thus, the shaped products in which only the xonotlite crystals have been transformed into wollastonite crystals have characteristics that they are not impaired in strength nor do they contract even when repeatedly subjected to a high temperature of approximately 1000° C. to 1050° C. This is apparent in Table 17 below.

TABLE 17

| Product No. | Product number before firing | Bulk density | Bending strength (kg./cm.²) | After 3 hrs.' firing at 1,000° C. | |
|---|---|---|---|---|---|
| | | | | Bending strength (kg./cm.²) | Coefficient of linear contraction (percent) |
| 31' | 31 | 0.21 | 4.74 | 4.70 | 0.01 |
| 32' | 32 | 0.29 | 9.20 | 8.91 | 0.03 |
| 33' | 33 | 0.39 | 13.10 | 13.00 | 0.02 |
| 34' | 34 | 0.50 | 15.30 | 14.50 | 0.01 |
| 35' | 35 | 0.60 | 21.20 | 20.10 | 0.02 |
| 36' | 36 | 0.69 | 30.30 | 29.50 | 0.0 |

EXAMPLE 7

To 1117 parts of the aqueous slurry of xonotlite crystals obtained in the same manner as in Example 6 were added 70 parts of 10% water dispersion of asbestos fibers and then mixed thoroughly.

Six kinds of shaped products having different bulk densities shown below were produced in the same manner as in Example 6 from the resultant mixture.

TABLE 18

| Product No.: | Bulk density |
|---|---|
| 37 | 0.20 |
| 38 | 0.30 |
| 39 | 0.40 |
| 40 | 0.51 |
| 41 | 0.60 |
| 42 | 0.69 |

The structural characteristics of the resultant dried products were inspected by the same manner as in Example 4. From a micrograph of the broken surface of the products Nos. 37 to 39 having a bulk density ranging from 0.20 to 0.40, it was found that those products comprised a large number of agglomerates jointed with one another and asbestos fibers dispersed therein. While almost no agglomerates were found in the products Nos. 40 to 42 having higher density in the same micrograph thereof, it was ascertained by the measurement of the orientation index that such products Nos. 40 to 42 exhibited a specific orientation as shown in FIG. 7.

Figure 7:
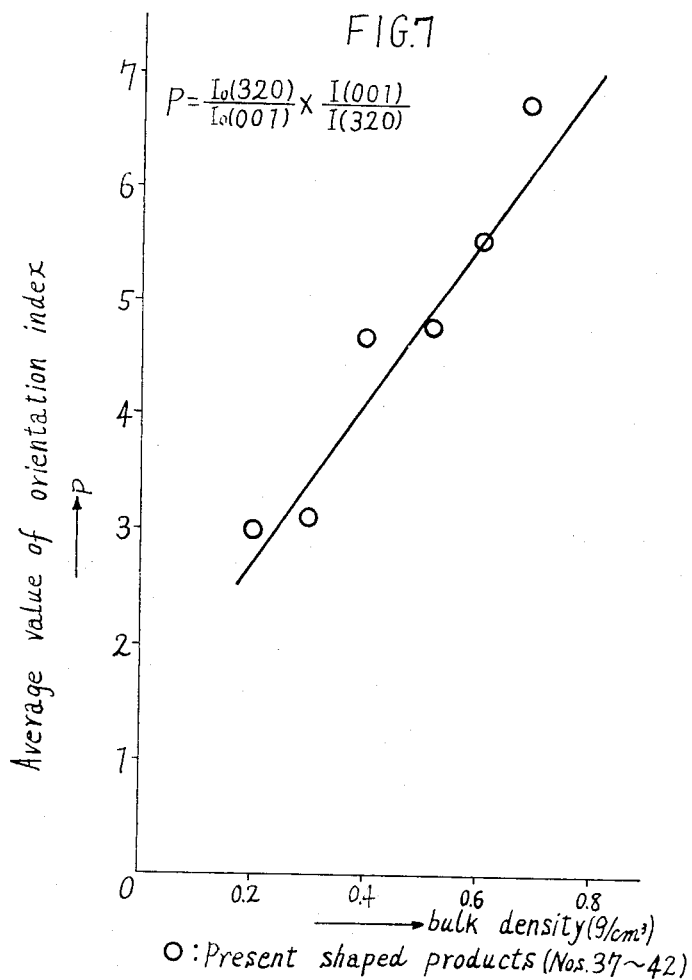

From FIG. 7 it is seen that the orientation index of the present products increases approximately in proportion to bulk density of the product and the products Nos. 40 to 42 show marked orientation exceeding 2.0 of the average value of the index.

The mechanical strength and heat resistance of the product were shown in Table 19 below.

TABLE 19

| Product number | After preparation | | After 3 hrs.' firing at 1,000° C. | |
|---|---|---|---|---|
| | Bulk density | Bending strength (kg./cm.²) | Bending strength (kg./cm.²) | Coefficient of linear contraction (percent) |
| 37 | 0.20 | 6.56 | 2.91 | 0.90 |
| 38 | 0.30 | 19.63 | 10.20 | 0.11 |
| 39 | 0.40 | 25.20 | 15.00 | 0.12 |
| 40 | 0.51 | 30.20 | 18.20 | 0.88 |
| 41 | 0.60 | 43.50 | 20.54 | 0.52 |
| 42 | 0.69 | 54.50 | 24.52 | 0.52 |

EXAMPLE 8

To 997 parts of the aqueous slurry of xonotlite crystals obtained in the same manner as in Example 6 was added 170 parts 10% water dispersion of bentonite the same as in Example 3 and then mixed thoroughly.

From the resultant mixture were prepared in the same manner as in Example 6 six kinds of shaped products having different bulk densities shown below.

TABLE 20

| Product No.: | Bulk density |
|---|---|
| 43 | 0.19 |
| 44 | 0.29 |
| 45 | 0.40 |
| 46 | 0.49 |
| 47 | 0.60 |
| 48 | 0.71 |

Figure 8:
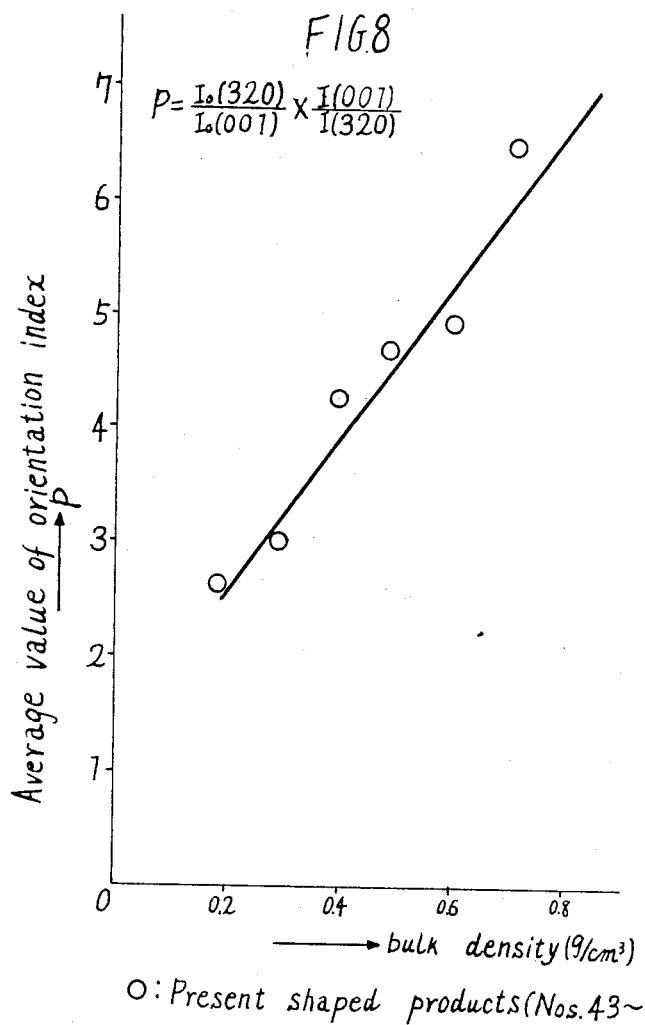

The structural characteristics of the resultant dried products were inspected by the same manner as in Example 6. From a photomicrograph of the broken surface of the products Nos. 43 to 45 having a bulk density ranging from 0.19 to 0.40, it was found that those products comprised large number of agglomerates jointed one another and clay dispersed therein. While almost no agglomerates were found in the products Nos. 46 to 48 having higher density through the same micrograph thereof, it was ascertained by the measurement of the orientation index that such products Nos. 46 to 48 exhibited a specific orientation as shown in FIG. 8. From FIG. 8 it is seen that the orientation index of the present products increases approximately in proportion to bulk density of the product and the product Nos. 46 to 48 show marked orientation exceeding 2.0 of the average value of the index.

The mechanical strength and heat resistance of the products were shown in Table 21 below.

TABLE 21

| Product number | After preparation | | After 3 hrs.' firing at 1,000° C. | |
|---|---|---|---|---|
| | Bulk density | Bending strength (kg./cm.²) | Bending strength (kg./cm.²) | Coefficient of linear contraction (percent) |
| 43 | 0.19 | 7.78 | 7.25 | 0.71 |
| 44 | 0.29 | 16.30 | 13.85 | 0.92 |
| 45 | 0.40 | 20.50 | 18.32 | 0.89 |
| 46 | 0.49 | 26.40 | 27.80 | 0.90 |
| 47 | 0.60 | 40.20 | 36.38 | 0.91 |
| 48 | 0.71 | 48.50 | 38.20 | 0.92 |

The X-ray diffraction, 120-diameter images of the broken section and 120-diameter transmission images of the respective shaped products in the above Example 8 which were fired at 1000° C. for 3 hrs. showed results similar to those obtained with respect to the products in Example 6 fired at 1000° C. for 3 hours. Thus, it was recognized that these shaped products were formed of β-wollastonite crystals as the fired products in Example 6.

The bending strength of the products and the bending strength and coefficient of linear contraction after further firing at 1000° C. for 3 hrs. of the same are given in the table following.

TABLE 22

| Product number | Product number before firing | Bending strength (kg./cm.²) | After 3 hrs.' firing at 1,000° C. | |
|---|---|---|---|---|
| | | | Bending strength (kg./cm.²) | Coefficient of linear contraction (percent) |
| 43' | 0.19 | 7.25 | 6.80 | 0.00 |
| 44' | 0.29 | 13.85 | 12.22 | 0.01 |
| 45' | 0.40 | 18.32 | 17.82 | 0.01 |
| 46' | 0.49 | 27.80 | 27.00 | 0.03 |
| 47' | 0.60 | 36.38 | 36.30 | 0.02 |
| 48' | 0.70 | 38.20 | 38.20 | 0.03 |

EXAMPLE 9

To 913 parts of the aqueous slurry of xonotlite crystals obtained in the same manner as in Example 6 was added 70 weight parts of 10% water dispersion of asbestos fiber and 170 weight parts of 10% water dispersion of bentonite the same as in Example 3 and then mixed thoroughly, from which six kinds of shaped products having different bulk densities shown below were prepared in the same manner as in Example 6–(2).

TABLE 23

Product No.: Bulk density
49 .................................................. 0.17
50 .................................................. 0.28
51 .................................................. 0.38
52 .................................................. 0.49
53 .................................................. 0.57
54 .................................................. 0.65

Figure 9:
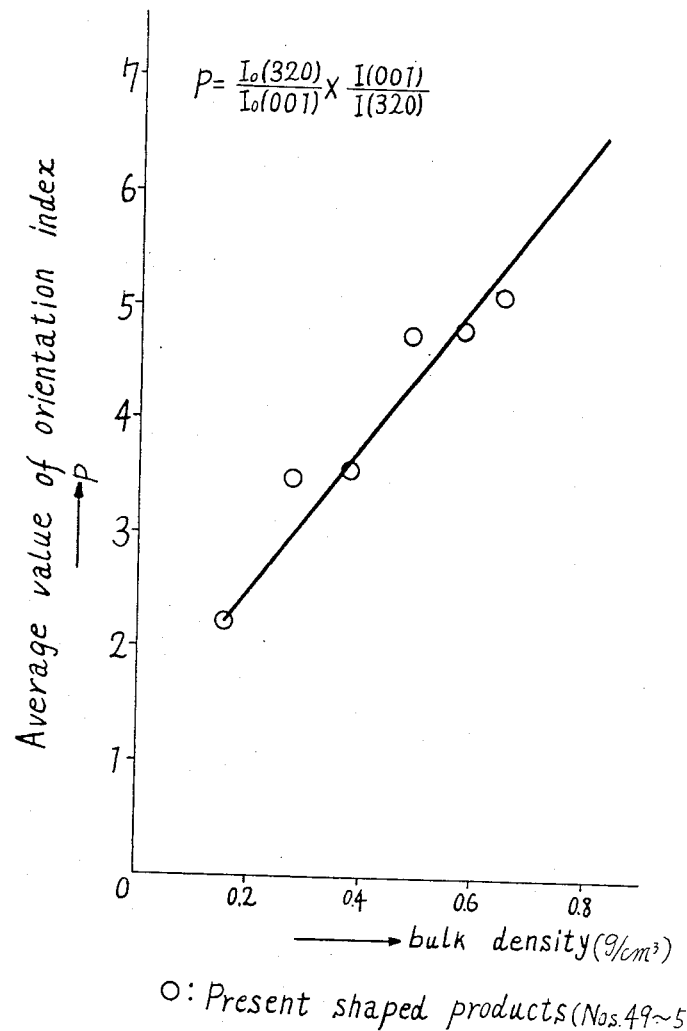

The structural characteristics of the resultant dried products were inspected by the same manner as in Example 6. From a micrograph of the broken surface of the products Nos. 49 to 51 having a bulk density ranging from 0.17 to 0.39, it was found that those products, comprised larger number of agglomerates jointed with one another and asbestos fiber and clay dispersed therein. While almost no agglomerates were found in the products Nos. 52 to 54 having higher density through the same micrograph thereof, it was ascertained by the measurement of the orientation index that such products Nos. 52 to 54 exhibited a specific orientation as shown in FIG. 9. From FIG. 9 it is seen that the orientation index of the present products increases approximately in proportion to bulk density of the product and the products Nos. 52 to 54 show marked orientation exceeding 2.0 of the average value of the index.

The mechanical strength and heat resistance of the products were shown in Table 24 below.

TABLE 24

| Product number | After preparation | | After 3 hrs.' firing at 1,000° C. | |
|---|---|---|---|---|
| | Bulk density | Bending strength (kg./cm.²) | Bending strength (kg./cm.²) | Coefficient of linear contraction (percent) |
| 49 | 0.17 | 6.82 | 6.53 | 0.74 |
| 50 | 0.28 | 21.52 | 20.62 | 0.74 |
| 51 | 0.38 | 31.20 | 32.30 | 0.68 |
| 52 | 0.49 | 40.35 | 42.60 | 0.68 |
| 53 | 0.57 | 52.40 | 44.50 | 0.69 |
| 54 | 0.65 | 62.30 | 56.30 | 0.69 |

EXAMPLE 10

To 20.3 liters of water were added quick lime and amorphous silica the same as in Example 6 in the amounts shown in Table 25 and the mixture was thoroughly mixed to produce six kinds of starting slurries.

TABLE 25

| Slurry number | Amount | | Molar ratio (CaO/SiO₂) |
|---|---|---|---|
| | Quick lime used (g.) | Amorphous silica used (g.) | |
| S-7 | 785 | 905 | 0.90/1 |
| S-8 | 805 | 885 | 0.95/1 |
| S-9 | 816 | 874 | 0.975/1 |
| S-10 | 828 | 862 | 1.00/1 |
| S-11 | 847 | 843 | 1.05/1 |
| S-12 | 868 | 822 | 1.10/1 |

Each starting slurry thus obtained was placed in an autoclave, 30 cm. in diameter and 40 cm. in depth, equipped with an agitator and heated with stirring of 60 r.p.m. at 187° C. under a steam pressure of 11 kg./cm.² gauge for 10 hours. Thus 6 kinds of the aqueous slurries of calcium silicate crystals having a solid concentration of 8.3 percent were obtained.

The X-ray diffraction of the crystals contained in each resultant slurry gave strong patterns at 7.08 A., 3.23 A., 3.08 A. and 2.83 A., showing the crystals having xonotlite crystalline structure. The dark ground micrograph and electron micrograph of each resultant slurry show that the slurry contained numerous agglomerates having a particle size of 40 to 150$\mu$ which comprised numerous lathe-like xonotlite crystals interlocked with one another.

913 parts of the respective slurries were mixed with 70 parts of 10% water dispersion of asbestos fibers and 170 parts of 10% water dispersion of bentonite and shaped products were prepared therefrom in the same manner as in Example 6, with the results shown in Table 26 below.

TABLE 26

| Product Number | Slurry used (slurry number) | Bulk density | Bending strength (kg./cm.²) | After 3 hrs.' firing at 1,000° C. | |
|---|---|---|---|---|---|
| | | | | Bending strength (kg./cm.²) | Coefficient of linear contraction (percent) |
| 55 | S-7 | 0.20 | 5.63 | 2.43 | 0.87 |
| 56 | S-8 | 0.20 | 6.50 | 5.20 | 1.07 |
| 57 | S-9 | 0.18 | 6.40 | 5.30 | 1.00 |
| 58 | S-10 | 0.18 | 5.40 | 4.82 | 1.00 |
| 59 | S-11 | 0.19 | 8.58 | 4.25 | 1.21 |
| 60 | S-12 | 0.19 | 6.56 | 3.20 | 1.40 |

Through the inspection of a micrograph of the broken surface of each shaped product thus obtained it wereascertained to be formed with numerous agglomerates jointed with one another.

EXAMPLE 11

To 20.30 liters of water was added 757 g. of quick lime for slaking and to the resultant solution of slaked lime was added 933 g. of amorphous silica the same as in Example 6 to produce a starting slurry.

The starting slurry thus obtained was reacted in the same manner as in Example 6 except that the slurry was heated at 194° C. under a steam pressure of 13 kg./cm.² for 3 hours, producing an aqueous slurry of calcium silicate crystals having a solid concentration of 8.3%.

The X-ray diffraction of the crystals contained in the slurry gave a pattern peculiar to tobermorite and xonotlite crystals, and thus the crystals were ascertained a mixture of both crystals. The dark ground micrograph and electron micrograph of each resultant slurry showed that the slurry contained numerous agglomerates, globular in shape, having a particle size of 20 to 150$\mu$ which was constituted from numerous plate-like tobermorite crystals and lathe-like xonotlite crystals interlocked three-dimensionally with one another.

From the resultant slurry mixed or not mixed with asbestos and/or bentonite the same as in Example 3 in the proportion shown in Table 27 below were prepared in the same manner as in Example 6 shaped product having the properties shown in the Table 27.

TABLE 27

| Product Number | Solid additives (percent to solid) | | Bulk density | After 3 hrs.' firing at 800° C. | | |
|---|---|---|---|---|---|---|
| | Asbestos | Bentonite | | Bending strength (kg./cm.²) | Bending strength (kg./cm.²) | Coefficient of linear contraction (percent) |
| 62 | 7 | 0 | 0.196 | 5.21 | 3.22 | 0.84 |
| 63 | 0 | 17 | 0.190 | 6.30 | 4.58 | 0.85 |
| 64 | 7 | 17 | 0.207 | 7.00 | 5.51 | 0.94 |

Through the inspection of a micrograph of broken surface of each shaped product thus obtained it was ascertained to be formed with numerous agglomerates jointed one another.

EXAMPLE 12

To 17 liters of water were added 833 g. of quick lime and 867 g. of g. of amorphous silica same as in Example 6 and the resultant slurry was reacted in the same manner as in Example 6 except a 213.8° C. temperature and 20 kg./cm.² gauge steam pressure were applied for 5 hours, producing an aqueous slurry of calcium silicate crystals having a solid concentration of 10 percent.

The X-ray diffraction of the crystals contained in the slurry gave a pattern peculiar to xonotlite crystals. The dark ground micrograph and electron micrograph of each resultant slurry showed that the slurry contained numerous aggolemates, globular in shape, having a particle size of 10 to 150µ which was constituted from numerous lathe-like xonotlite crystals three-dimentionally interlocked with one another.

From the resultant slurry mixed or not mixed with asbestos and/or bentonite passing through a 325 mesh screen in the proportion shown in Table 28 below were prepared in the same manner as in Example 6 shaped products having the properties shown in Table 28.

TABLE 28

| Product Number | Solid additives (percent to solid) | | Bulk density | After 3 hrs.' firing at 1,000° C. | | |
|---|---|---|---|---|---|---|
| | Asbestos | Bentonite | | Bending strength (kg./cm.²) | Bending strength (kg./cm.²) | Coefficient of linear contraction (percent) |
| 65 | 7 | 0 | 0.20 | 7.76 | 3.01 | 0.97 |
| 66 | 17 | 17 | 0.18 | 7.78 | 5.27 | 0.60 |

Through the inspection of a micrograph of the broken surface of each shaped product thus obtained it was ascertained to be formed with numerous agglomerates jointed with one another.

EXAMPLE 13

To 20.3 liters of water were added 759 g. of quick lime, 813 g. of amorphous silica same as in Example 6 and 118 g. of asbestos, and the resultant slurry was reacted in the same manner as in Example 6 except a temperature of 183° C. and a steam pressure of 10 kg./cm.² was applied for 10 hours, producing an aqueous slurry of calcium silicate crystals having a solid concentration of 8.3%.

The X-ray diffraction of the crystals contained in the slurry gave a specific pattern of xonotlite crystals. The dark ground micrograph and electron micrograph of each resultant slurry showed that the slurry contained numerous agglomerates, globular in shape, having a particle size of 10 to 150µ which was constituted from numerous lathe-like xonotlite crystals three-dimensionally interlocked with one another and that almost all of the agglomerates tangled about the asbestos fibers.

From the resultant slurry were prepared in the same manner as in Example 6 shaped products having the properties shown in Table 29 below.

TABLE 29

| Product Number | Bulk density | After 3 hrs.' firing at 1,000° C. | | |
|---|---|---|---|---|
| | | Bending strength (kg./cm.²) | Bending strength (kg./cm.²) | Coefficient of linear contraction (percent) |
| 67 | 0.20 | 9.0 | 7.3 | 1.02 |
| 68 | 0.31 | 17.5 | 12.7 | 1.10 |
| 69 | 0.48 | 29.3 | 22.6 | 1.00 |
| 70 | 0.60 | 42.6 | 30.3 | 1.10 |

EXAMPLE 14

To aqueous slurry of xonotlite crystals obtained in the same manner as in Example 6 was added 10% water dispersion of pulp fiber in the proportion set forth in Table 30 below. The mixture thus prepared was made into a sheet and dehydrated with a press roll by means of a paper machine and dried. The physical properties of the resultant shaped products are given in Table 30 below.

TABLE 30

| Product Number | Amount of pulp fiber (percent to solids) | Bulk density | Bending strength (kg./cm.²) |
|---|---|---|---|
| 71 | 5 | 0.21 | 7.8 |
| 72 | 5 | 0.44 | 38.0 |
| 73 | 10 | 0.21 | 10.3 |
| 74 | 10 | 0.45 | 40.3 |
| 75 | 40 | 0.30 | 30.0 |
| 76 | 50 | 0.32 | 30.0 |
| 77 | 70 | 0.35 | 35.0 |
| 78 | 80 | 0.37 | 37.0 |

The shaped products thus obtained were found to be useful as ceiling partition material.

EXAMPLE 15

To aqueous slurry of xonotlite crystals were added 20% water dispersion of portland cement and 10% water dispersion of asbestos fiber in the proportion shown in the Table 31 below. From the mixture were obtained in the same manner as in Example 6–(2) shaped products having the following properties.

TABLE 31

| Product number | Solid additives (percent to solid) | | Bulk density | Bending strength (kg./cm.²) |
|---|---|---|---|---|
| | Asbestos | Cement | | |
| 79 | 10 | 10 | 0.31 | 18.9 |
| 80 | 10 | 20 | 0.38 | 20.3 |
| 81 | 10 | 30 | 0.45 | 21.3 |
| 82 | 10 | 40 | 0.60 | 25.3 |
| 83 | 10 | 50 | 0.71 | 20.2 |
| 84 | 10 | 60 | 0.70 | 22.9 |

What I claim is:

1. A shaped product of crystallized calcium silicate hydrate which consists essentially of numerous agglomerates of calcium silicate crystals being compressed to at least one direction and interlocked with one another and voids interspersed therebetween, said agglomerates having originally a substantially globular form of a diameter of 10 to 150μ formed of calcium silicate crystals three-dimensionally interlocked with one another.

2. The shaped product according to claim 1, in which said calcium silicate crystal is tobermorite crystal.

3. The shaped product according to claim 1, in which said calcium silicate crystal is xonotlite crystal.

4. The shaped product according to claim 1, in which said calcium silicate crystal is a mixture of tobermorite crystal and xonotlite crystal.

5. The shaped product according to claim 1, in which said calcium silicate crystal is β-wollastonite.

6. The shaped product according to claim 1, in which said agglomerates are seen in a micrograph of the broken surface of said shaped product taken at a magnification of 120 diameters.

7. The shaped product according to claim 1, in which said agglomerates are hardly seen in a micrograph of the broken surface of said shaped product taken at a magnification of 120 diameters but an average value of orientation index is not less than 2.0.

8. The shaped product of crystallized calcium silicate hydrate according to claim 1, in which said shaped product contains a reinforcing material.

9. The shaped product according to claim 1, in which said shaped product contains 3 to 50 percent by weight of a clay.

10. The shaped product according to claim 1, in which said shaped product contains 5 to 60 percent by weight of a cement.

References Cited
UNITED STATES PATENTS

| | | | |
|---|---|---|---|
| 2,540,354 | 2/1951 | Selden | 106—120 |
| 2,565,340 | 8/1951 | Anderson | 106—120 |
| 3,116,158 | 12/1963 | Taylor | 106—120 |
| 3,238,052 | 3/1966 | Burak et al. | 106—120 |
| 3,449,141 | 6/1969 | Binkley | 106—120 |
| 2,888,377 | 5/1959 | Allen | 106—306 |

JAMES E. POER, Primary Examiner

U.S. Cl. X.R.

106—97